July 17, 1934.                  C. HARRIS                 1,966,961
                        BALL AND SOCKET CONNECTION
                           Filed July 5, 1929
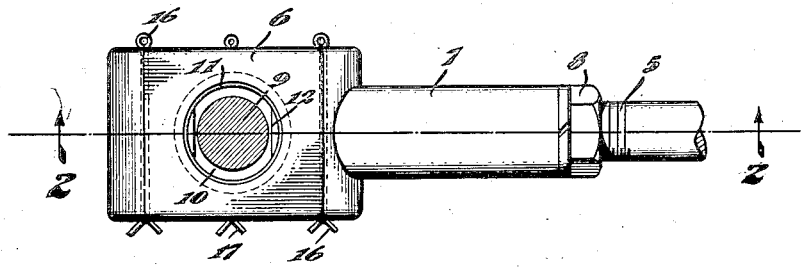
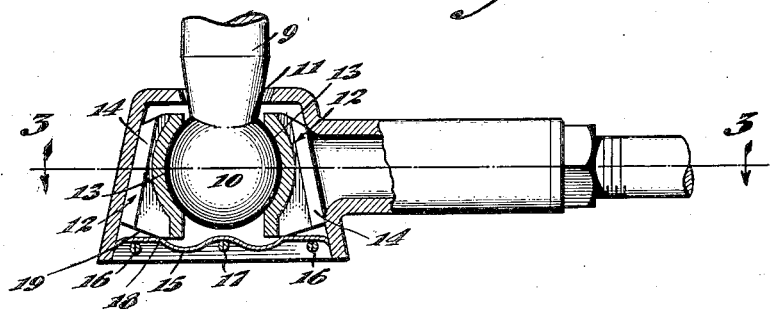
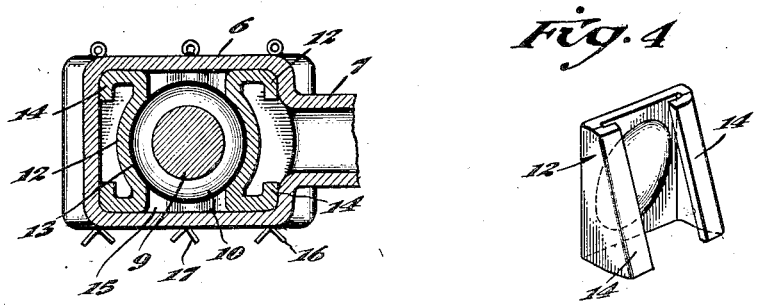
INVENTOR
Geo. Harris
BY
Word & Word ATTORNEYS Patented July 17, 1934

1,966,961

UNITED STATES PATENT OFFICE 1,966,961

BALL AND SOCKET CONNECTION

Cleo. Harris, Cincinnati, Ohio, assignor, by mesne assignments, to Thompson Products, Incorporated, Cleveland, Ohio, a corporation of Ohio Application July 5, 1929, Serial No. 375,955

2 Claims. (Cl. 287—90)

This invention relates to connecting rods such as tie rods, drag links, steering rods and the like, and is particularly directed to improvements in the socket or hub at the end of the rod for receiving the ball end of a crank arm or lever of any sort. The ball connector is journalled within the socket in ball seats or bearing elements, and the improvement herein set forth is primarily for the purpose of providing efficient means for automatically taking up any play created by wear of the ball seats. The pounding and vibration of the parts and the natural rotative movement of the ball on the seats, constantly grind down the metal due to frictional contact, and unless the seats are maintained under pressure in even contact at all points about the ball, the wear is unequal and the contact surfaces of the ball and seats lose their corresponding cooperating contours.

It is therefore an object of this invention to provide a ball and socket connection wherein the seats are constantly urged against the ball, and the adjustment or take-up thrusts imposed on the connection are properly directed to cause the, otherwise detrimental, contact of the ball and seats to grind the surfaces correspondingly and to true even seating contour. The ball seats and socket are so related as to cooperate in directing the seats for achieving this uniform contact pressure for wear compensation.

It is another object to provide a device and arrangement of ball seats for automatically taking up for wear which prevents any loosening or back movement of the ball seats.

Another object relates to the general form of the socket, the relation of the ball seats thereto, and the mounting of the automatic adjustment means within the socket casing.

Further objects and advantages will be more fully set forth in a description of the accompanying drawing, in which:

Figure 1 is a side view of the improved socket.

Figure 2 is a sectional view taken on line 2—2, Figure 1, the view being taken on the plane of the ball crank or arm connected to the socket of the reach rod and illustrating in detail the relation of the bearing seats to the walls of the casing and the disposition of the take-up spring relative to the ball seats.

Figure 3 is a sectional view taken on line 3—3, Figure 2, further illustrating the form of the socket and the arrangement of the ball seats therein.

Figure 4 is a perspective view of one of the ball seats.

The invention described in general comprises a socket casing disposed on the end of a rod containing a pair of bearing blocks, the bearing blocks disposed one at each side of a ball formed on the end of a crank arm and disposed within the socket. The socket of the casing is conical as to two sides against which corresponding faces of the seats respectively engage, and open at the large end wherein a plate spring is mounted against the ends of the ball seats.

The respective seats are forced down the inclined interior surfaces of the socket by means of the spring so that the take-up thrusts directed from the inclined surfaces are imparted substantially toward the center of the ball. The spring provides a constant pressure, being under compression against the seats, and the inclination of the casing is relatively slight so that there is very little force imparted from the ball to force the wedges outwardly or along the inclined surfaces, this slight force being overcome by the comparatively light spring used.

Referring to the drawing, the rod is indicated at 5 and the socket element or casing 6 is screw-threaded on the end of the rod. The casing provides a tubular portion 7 extending at right angles from the socket portion, this tubular portion being the, internally threaded, attaching end of the socket. A nut 8 is provided on the rod engaging the end of the tubular portion of the casing to secure the same in adjusted position on the rod.

The crank arm 9 having the ball end 10 previously described, is inserted through the casing through the open or large end thereof, the shank of the crank arm traversing an aperture 11 in the base of the socket. Two of the casing walls are inclined and the ball seats 12—12 are disposed against the respective walls mentioned.

Each ball seat 12, as illustrated in Figure 4, is formed from a single piece of plate and provides a ball seating face having a concave depression 13 therein for encircling a portion of one side of the ball. The plate has its edges turned back and inwardly, the inward flanges 14 thus formed being inclined relative to the face of the seat, the inclination corresponding to the inclination of the socket casing walls.

A slight clearance is left between the open end of the casting and the ball seats when they are primarily set about the ball. Within this clearance space a plate spring 15 is mounted, the plate spring having its ends sprung down and set within the casing against the bearing blocks by means of pins 16 traversing the straight side walls of the socket casing. The spring is initially of bowed form and the central part for assembly purposes is set within the casing and maintained therein, while the end compressing pins are set, by means of a third pin 17 traversing the straight walls of the casing centrally thereof and on a line with the axis of the crank arm.

The plate spring after being set in position has a tendency to leave the central pin to assume its bowed condition, as the wearing of the bearing surfaces takes place, so that the curved portions at which the bending takes place engage the outer edges of the ball seats under spring pressure induced by the retaining pins, and the tendency of the central portion of the spring plate is to leave the initial securance pin 17, it being understood that this pin is principally for the purpose of assembly, but being left in position to guard against outward accidental displacement.

The plate is formed to provide inner edges 18 which engage outwardly inclined end surfaces 19 of the bearing seats. The action of the spring therefor as the center of the spring moves in or bows, is to create a camming or sliding action of the edges down the inclined surfaces 19, which has a tendency to urge the outer or spring engaged ends of the ball seats toward the ball and to compensate for the slightly greater contact and pressure induced at the wedge points or forward ends of the bearing blocks.

As the wedge-shaped bearing blocks are forced deeper into the casing with the ball, the thrusts from the ball acting at right angles to the bearing block contact faces are incapable of loosening the blocks and the slight force imparted axially of the crank arm, due to the engagement of the inclined wedge surfaces, is overcome and balanced by the spring. The movement and vibration of the parts, in instances where they are part of a vehicle, constantly firmly disposes the seats about the ball.

In many automotive installations the socket casing is hung on the ball (see the position shown in the drawing), and the entire weight of the reach rod is on its respective ball connections. The combined weight of the rod and socket casings is considerable and due to the force of gravity acting thereon, the result is to urge the casing against the seats and ball, this force coacting with the force or action of the spring which is directed upwardly against the seats and ball, thereby providing counteracting forces jointly aiding in maintaining the ball and socket connection in constantly snugly adjusted position. The spring is, therefore, not vital to the assembly of the rod for maintaining the seats against the ball and casing, but may be displaced or broken without resultant disconnection of the ball and socket joint. Therefore, in the case of accidental displacement or breakage, the safety feature arising from the gravity induced and maintained connection is evident.

Having described my invention, I claim:

1. A ball and socket joint, comprising, a socket casing having inclined walls and an open large end, an arm having a ball end disposed in said casing, a pair of bearing blocks surrounding said ball, and each engaging a respective inclined wall of said casing, a plate spring covering the open side of the casing, said plate spring bowed and sprung against the bearing blocks, means for retaining the plate in position, and said spring having cam surfaces thereon engaging inclined surfaces of the bearing blocks to urge the blocks inwardly toward the ball.

2. A ball and socket joint, comprising, a socket casing having inclined walls and an open large end, an arm having a ball end disposed in said casing, a pair of bearing blocks surrounding said ball and each engaging a respective inclined wall of said casing, a plate spring covering the open side of the casing, said plate spring bowed and sprung against the bearing blocks, and cross pins extending across the open casing side for retaining the outer ends of the plate in position whereby said blocks are urged against the ball.

CLEO. HARRIS.